Figure 1:
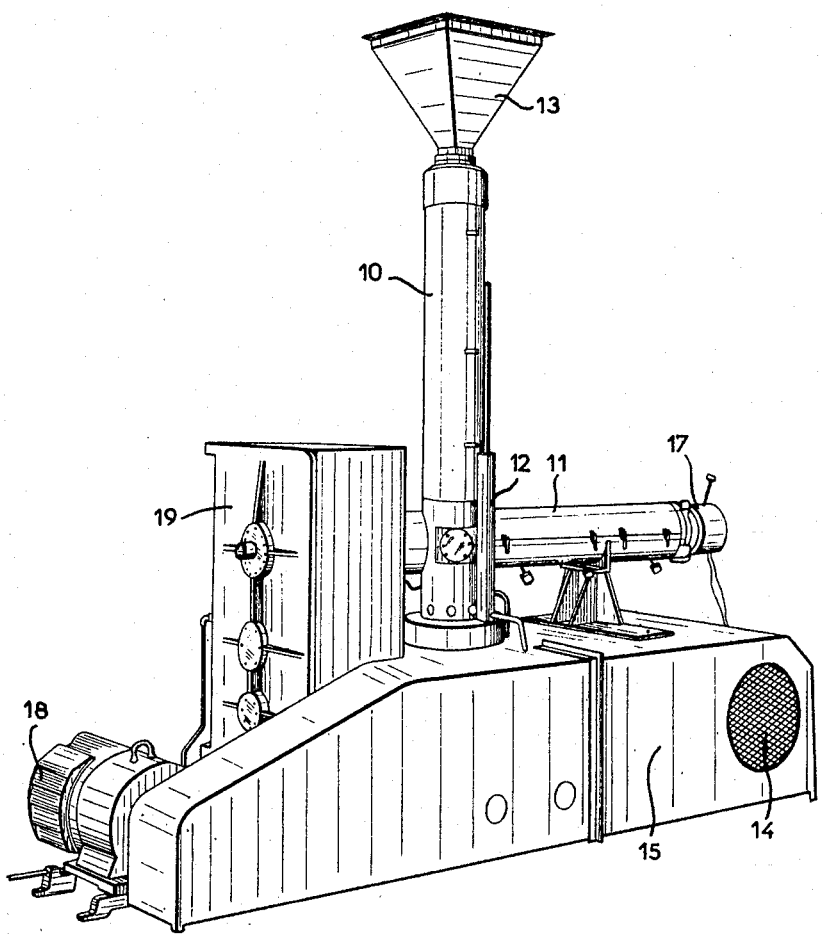

Sept. 27, 1966  L. ANDOUART  3,274,647
EXTRUSION MACHINES FOR PLASTIC MATERIAL
Filed June 19, 1964  3 Sheets-Sheet 1

INVENTOR
LEON ANDOUART
By Irwin S. Thompson
ATTY.

Sept. 27, 1966   L. ANDOUART   3,274,647
EXTRUSION MACHINES FOR PLASTIC MATERIAL
Filed June 19, 1964   3 Sheets-Sheet 3

INVENTOR
LÉON ANDOUART
By Irwin S. Thomson
ATTY.

3,274,647
EXTRUSION MACHINES FOR PLASTIC MATERIAL

Léon Andouart, Paris, France, assignor to Societe des Etablissements Andouart, Bezons, Seine-et-Oise, France, a corporation of France
Filed June 19, 1964, Ser. No. 376,388
Claims priority, application France, July 29, 1963, 942,994
3 Claims. (Cl. 18—12)

The present invention relates to extrusion machines for plastic material such as polyvinyl chloride or the like, and is concerned with improvements in these machines intended to improve the manufacture while at the same time reducing the expenditure of energy.

Conventional extrusion machines are generally composed of a single screw or two parallel screws which ensure the conveyance and the transformation of the material. This screw sometimes comprises two sections, one receiving the material to be transformed and ensuring the jellification of the said material, the other receiving the jellified material and bringing it under pressure to the extrusion members. There is sometimes provided between the two sections of the screw a means for de-gassing the jellified material. However, whether there is one or two sections, it is by a single screw, driven by a single motor-reduction gear set, that the two successive operations of jellification of the plastic material and the completion of the plastification and extrusion of the jellified paste are simultaneously effected.

This arrangement of simple design and easy to construct is not without disadvantages in practice. Its essential defect is that it renders the two operations of jellification and extrusion dependent on each other.

It is frequently the case that the working conditions for the jellification, in particular the speed of the screw in this phase of treatment, are not such as to be suitable for the compression and extrusion, and vice versa.

It has been proposed to remedy this drawback by adopting a different outline for the single screw in the two successive working zones. However, this solution maintains the dependence of the two positions of the screw and does not lend itself to an adaptation of the speed of rotation to the variable particular features of the material and of the operations of treatment.

In order to overcome this difficulty, it has been suggested to constitute the extrusion machine by two separate screws, each having its own particular control and each comprising its supply and evacuation devices, the evacuation of the first screw delivering into the feed of the second. This arrangement makes it possible to regulate the speed of each screw independently of the other.

However, whether it is a case of two screws or one only, the known arrangements have the drawback of having the drive of the jellification screw in the vicinity of the introduction of the material to be transformed. This material is in powder form and it infiltrates readily along the driving shaft, thus penetrating into the motor-reduction gear set which drives the screw, thus giving rise to the risk of seizure of the mechanical driving members.

The present invention has for its object a construction of extrusion machine which, while employing the arrangement with two screws separately driven, avoids the disadvantages indicated above and has other advantages as compared with former machines.

The extrusion machine according to the invention is characterized in that it comprises a vertical jellification screw with downwardly-moving circulation, co-operating with a horizontal extrusion screw, these two screws being substantially tangential at their point of intersection, and communicating directly with each other by a passage chamber at that point.

Each screw is provided with its own drive by an independent motor-reduction gear set of the variable-speed type. In this way, each screw can be given a speed of rotation adapted to the conditions of the work which it carries out.

The drive of the vertical jellification screw is effected at the base of the screw, and thus on the side opposite to the supply of raw powdered material. For this reason, at the extremity of the screw by which the drive is effected, there is only jellified material, compact and not in powder. Any risk of infiltration into the driving members is thus eliminated.

The passage chamber between the two screws through which is effected the transfer of the jellified material in the extrusion screw, is a closed chamber protected against outside agents. It is preferably employed to ensure the de-gassing of the jellified material by putting it into communication with the atmosphere or with a source of vacuum. This de-gassing is furthermore facilitated and rendered more complete by the fact that in the said passage chamber the material is subjected to an expansion and to a change in direction at right angles.

The arrangement according to the invention, in spite of the presence of two separate driving sets, makes it possible to reduce the total consumption of energy by a very considerable amount. It ensures an excellent efficiency of the operations, which has the result either of increasing the output or conversely, for the same output, of reducing the length and the diameter of the screws, and thus of a reduction in the overall size of the extrusion machine.

Figure 2:
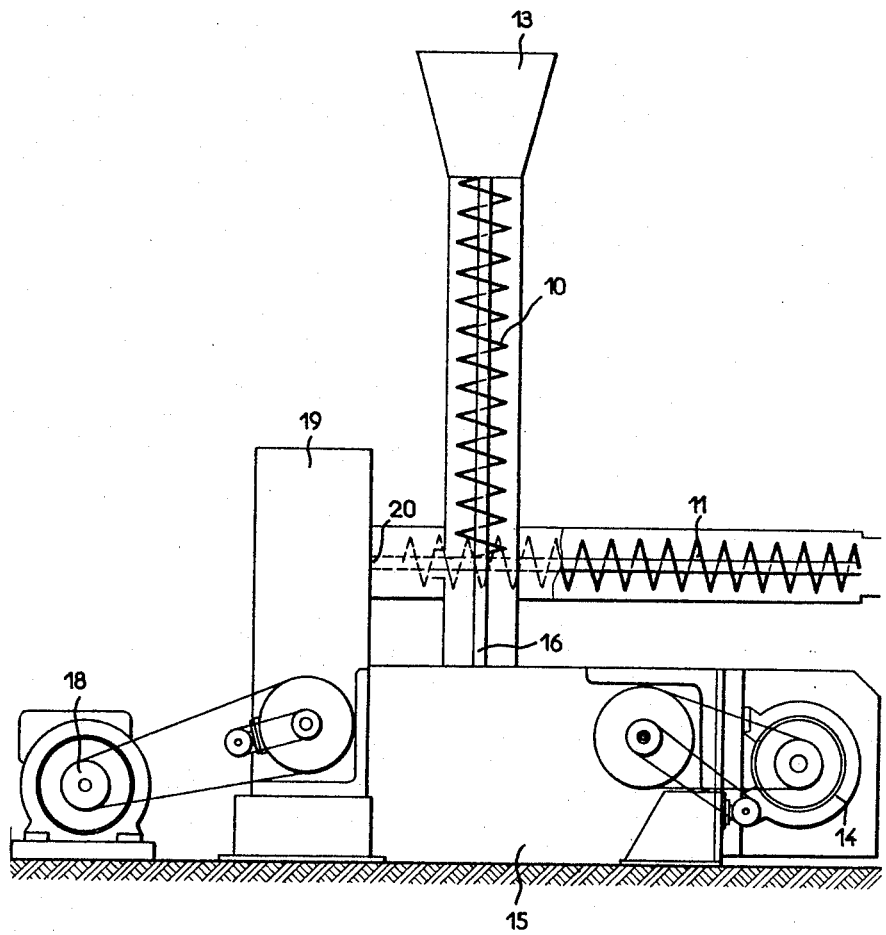
Figure 3:
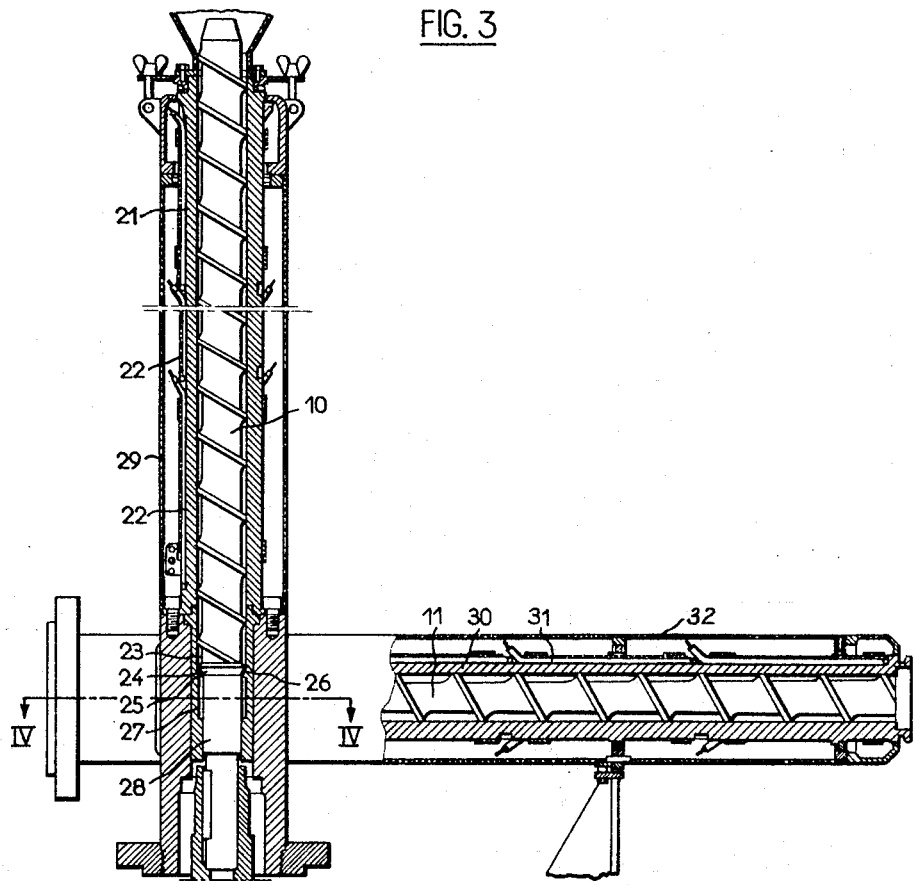
Figure 4:
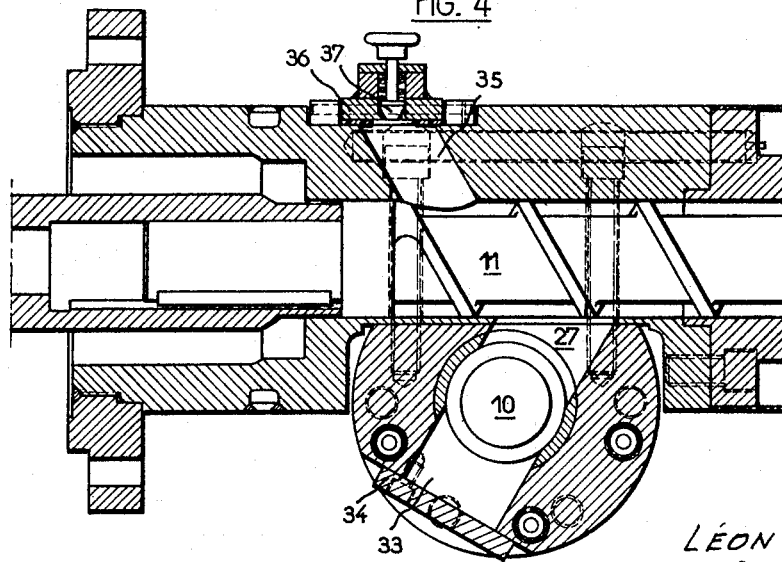

The accompanying drawings show by way of example and without limitation, one form of construction of an extrusion machine according to the invention. In these drawings:

FIG. 1 is a general view in perspective.
FIG. 2 is an explanatory diagram.
FIG. 3 is a view of the extrusion machine in longitudinal section.
FIG. 4 is a horizontal section on a larger scale, taken along the line IV—IV of FIG. 3.

The extension machine is essentially composed of a vertical screw 10 and a horizontal screw 11, tangential to each other at their point of intersection 12, the combined assembly of the two screws 10 and 11 taking the form of an L.

The vertical screw 10 is intended to ensure jellification. It is provided at its upper portion with a supply hopper 13 receiving the powdered raw material, such as for example polyvinyl chloride monomer in powder form. This screw 10 is driven in rotation by a set comprising a motor 14 and a reduction gear 15 attached to its lower extremity 16.

The horizontal screw 11 is arranged so as to ensure the compression and extrusion of the plastified material. It is provided at its extremity with appropriate lamination devices 17. It is driven by the motor 18 actuating a reduction gear 19 which drives the screw at the end 20, at the extremity opposite to the laminating device 17.

In the zone 12 in which the two screws 10 and 11 cross each other is arranged a chamber forming a communicating passage between the two screws.

It thus appears that the plastic material, such as polyvinyl chloride in powder form, introduced through the hopper 13, is carried away downwards, or is so to speak "swallowed" by the screw 10. This screw is arranged in a tubular casing 21 (FIG. 3) which is equipped on its exterior with resistance heaters 22. Under the action of pressure and heat, the material jellifies and progressively assumes a plastic consistency. It is in this condition that it reaches the base of the screw at 23.

This extremity is provided with a conical shoulder 24 which co-operates with a further conical portion 25 of the casing so as to form a throttle 26. This throttle 26 opens into the chamber 27 which forms the communicating passage between the screws 10 and 11. The section of the passage in the throttle 26 is variable as a function of the material employed and the working conditions of the material. This regulation is obtained by displacement of the vertical screw 10.

The chamber 27 is traversed by the shaft 28 of the screw which receives its movement from the motor-reduction gear set 14–15. This shaft 28 may comprise a device for effecting a scraping action on the chamber 27. A casing 29 ensures external protection.

By virtue of the throttle 26, the material is already partially plastified as it escapes from the screw 10 so as to pass into the chamber 27 and proceed to the screw 11. This plastified material forms a joint which prevents any infiltration of material into the reduction gear 15.

In a similar manner, the screw 11 is contained in a casing 30 provided with resistance heaters 31 and with a protective outer casing 32.

One method of forming the passage chamber 27 from the screw 10 to the screw 11 is shown in FIG. 4. It is formed by a bore 33 at right angles to the casing of the screw 10. This bore is closed by a removable cover 34 which permits access and inspection of the chamber 27.

Communicating with the screw 10, a de-gassing bore is formed at 35. Depending on the case, this bore permits the chamber 27 to be put into communication with the atmosphere or with a vacuum pump. In this latter case, the orifice 35 is closed by a cover 36 which ensures fluid-tightness at the opening valve 37.

The plastic material transferred through 27 from the schew 10 to the screw 11 is carired away by this latter. It is compressed and heated, its plastic transformation is completed and it is extruded at the extremity of the screw 11 into any appropriate shaping device.

The extrusion machine thus constituted lends itself to the individual regulation of the jellification and of the lamination, independently of each other. It ensures a product of very good quality with an excellent efficiency, in particular with a very moderate expenditure of energy. For an overall size substantially less than the usual types of extrusion machine, it ensures a higher output.

What I claim is:

1. In an extrusion machine for the manufacture of objects of plastic material from powder, comprising a vertical screw that feeds downwardly to a horizontal screw, the improvement comprising heating means for said vertical screw so that a monomeric plastic powder may be transformed to a jelly during passage along said vertical screw, drive means for said vertical screw connected to the lower extremity of said vertical screw, and a supply hopper coaxial with the upper end of said vertical screw, the axes of said screws being spaced apart and a portion of said vertical screw extending down beside said horizontal screw.

2. An extrusion machine as claimed in claim 1, and means for axially displacing said vertical screw relative to said horizontal screw thereby to regulate the passage of the plastic material between said vertical and horizontal screws.

3. An extrusion machine as claimed in claim 1, in which said vertical screw terminates upwardly in a free upper end disposed in said hopper.

References Cited by the Examiner

UNITED STATES PATENTS

| | | | |
|---|---|---|---|
| 1,156,096 | 12/1915 | Price. | |
| 1,361,346 | 12/1920 | Nichols | 18—12 XR |
| 1,666,067 | 4/1928 | Baillie et al. | |
| 2,369,359 | 2/1945 | MacWilliams et al. | |
| 2,519,014 | 8/1950 | Bankey. | |
| 2,617,167 | 11/1952 | Johnson | 18—12 XR |
| 3,065,502 | 11/1962 | Lorenian | 18—12 |
| 3,067,462 | 12/1962 | Kullgren | 18—12 |
| 3,110,930 | 11/1963 | Beck | 18—8 |
| 3,113,843 | 12/1963 | Wen Han Li | 18—12 XR |
| 3,158,900 | 12/1964 | Heston | 18—12 |
| 3,183,553 | 5/1965 | Slayter | 18—12 |

WILLIAM J. STEPHENSON, *Primary Examiner.*